(No Model.)
H. H. EAMES.
DEVICE FOR COLLECTING METALLIC ORES.
No. 403,256. Patented May 14, 1889.
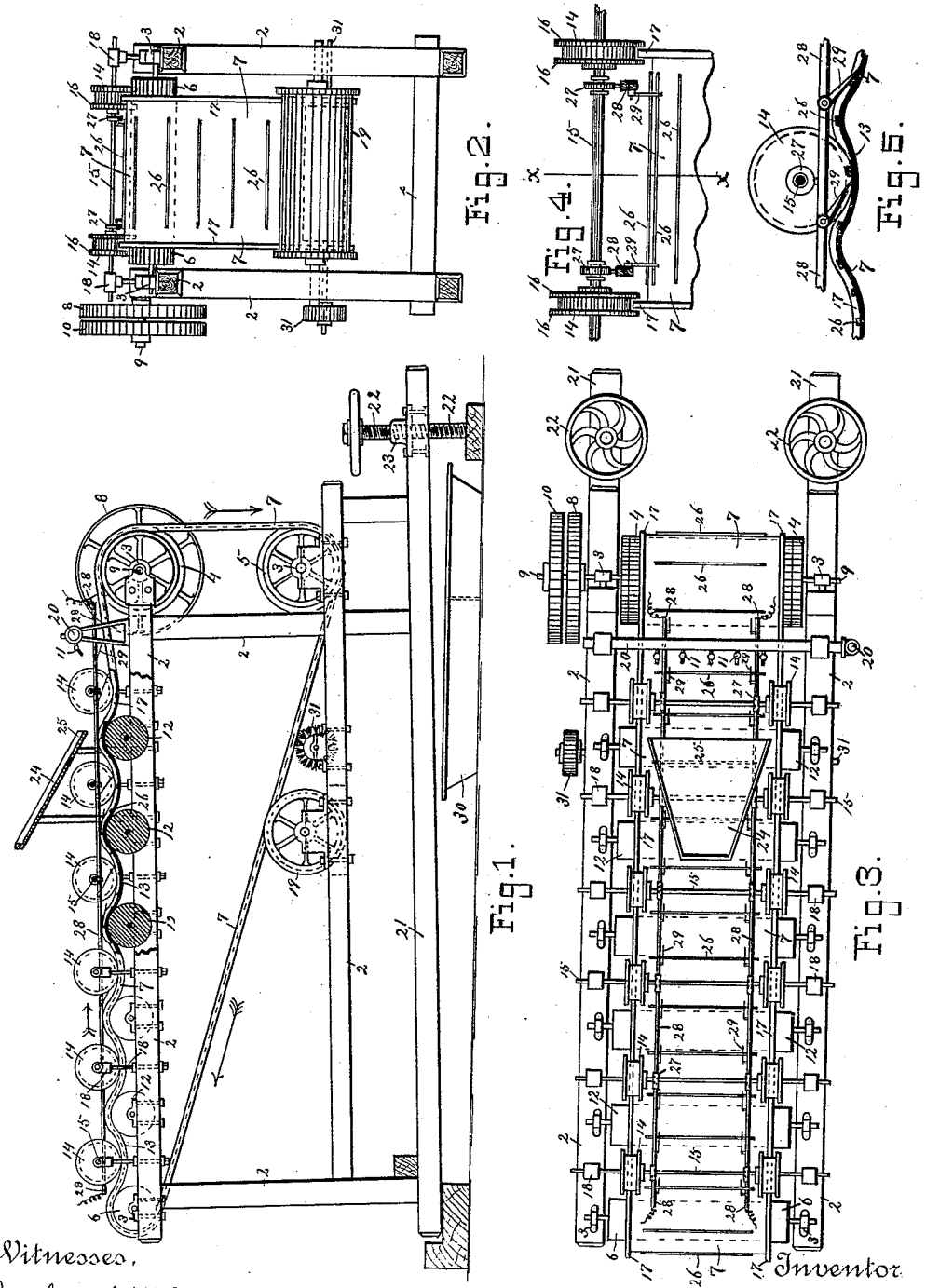
Witnesses.
Reuben A. McCauley
E. R. Rowley
Inventor
Henry H. Eames
By his Attorney
Wm. Le Bailie

UNITED STATES PATENT OFFICE.

HENRY H. EAMES, OF BALTIMORE, MARYLAND.

DEVICE FOR COLLECTING METALLIC ORES.

SPECIFICATION forming part of Letters Patent No. 403,256, dated May 14, 1889.

Application filed May 14, 1888. Serial No. 273,767. (No model.)

*To all whom it may concern:*

Be it known that I, HENRY H. EAMES, a citizen of the United States, residing at Baltimore, in the State of Maryland, have invented certain new and useful Improvements in Devices for Collecting Metallic Ores; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvement in the devices for concentrating iron ore and collecting therefrom the magnetic iron; and it consists of certain devices whereby the ores containing the metal are subjected to the action of flowing water, the iron separated from the accompanying gangue, and by magnetism induced in the particles of iron causing them to attach themselves to iron plates, and thereby deposited in a receptacle therefor, all of which I accomplish by the devices hereinafter fully described and claimed, reference being had to the accompanying drawings, in which—

Figure 1 shows a side elevation of the device, a part of one frame being removed and showing part of bed, rollers, and feeder in section. Fig. 2 shows a view, looking from the left, on the end of the device shown in Fig. 1. Fig. 3 shows a view in full, looking down on the device shown in Fig. 1. Fig. 4 shows a detailed view, somewhat enlarged, of one of the upper rollers, a part of the bed, and the devices for conducting the electric current shown in Fig. 1. Fig. 5 shows a cross-section of the device shown in Fig. 4, the section being indicated by the line X X, the conducting-plates being shown somewhat enlarged.

The same figures refer to the same or similar parts throughout the several views.

Fig. 2 denotes the frame of the device, which has thereon suitable bearings, 3, to support the rollers 4, 5, and 6. Passing over these rollers 4, 5, and 6 is the endless bed 7, which may be made of any desired width or length and of any impervious flexible material, the roller 4 imparting the necessary movement to the said bed in the direction indicated by the arrows, by means of the driving-pulley 8, which is fixed to the projecting end of the shaft 9 of the said roller 4, which may be driven by steam or other power, a loose pulley, 10, being provided, as in common usage, for convenience of manipulation.

In order to impart an undulating movement to the upper surface of the bed 7, over which flows the water from the faucets 11, the intermediate support or rollers, 12, are distributed at equal distances one from the other along the top of the frame 2, the said rollers being constructed of wood, extending the width of the bed, and between each of which a depression or slight bite, 13, is made in the said bed 7 by sufficient slack being allowed thereto for this purpose, these depressions 13 being properly maintained by means of the upper rollers, 14, which are constructed as represented in Fig. 4, the said rollers being fixed to a shaft, 15, and are provided with the flanges, 16, which serve as a guide, in which move the raised sides 17 of the bed 7, these raised sides 17 being made of rubber or any suitable material and serve to prevent the water from washing over the sides of the bed. These upper rollers, 14, are supported by means of bearings 18, that are secured to the top of the frame 2 in such manner that the said rollers 14 may be raised or lowered, and thus increase or lessen the amount of the depression 13, as may be desired, a supporting-roller, 19, Fig. 1, which may be moved to the right or left, serving to take up or give slack for this purpose.

To feed the material which is to be washed to the device, a feeder, 24, is provided, which is set at the incline shown in Fig. 1 and of the tapered form shown in Fig. 3, its discharging end 25 being nearly the width of the bed, whereby the material will be properly distributed over the bed when thrown thereon, and that the water from the faucets 11, which receive the supply from the pipe 20, may be caused to flow over the bed 7 with any desired velocity, the lower stringer, 21, of the frame has on the end thereof the elevating-screws 22, which move in a suitable nut, 23, whereby the inclination of the bed may be increased or diminished at pleasure.

The depressions 13 of the bed, which are formed by the rollers 12 and 14, serve to entrap the particles of ore, which, in the washing process to which it has been subjected by the flowing water on the bed, will be separated from the gangue by the greater gravity thereof, and quietly settle in these lower parts, where there is less agitation from the flowing water. In order to collect these particles of iron ore which are so deposited and to deposit them in a proper receptacle therefor, the bed 7 is provided on the outer surface thereof with the soft-iron plates 26, which are placed as close together as will insure insulation of one from the other, and are extended nearly the width of the bed. Suspended from the shaft 15 of the upper rollers, 14, by some suitable insulation, 27, in which the said shaft 15 is free to rotate, are the conducting-bars 28, which form the terminals of a galvanic battery or dynamo, between which an electric circuit is completed through the metallic plates 26 by means of the pawls 29, which, in the movement of the bed 7, are caused to slide over the ends of the said plates, these pawls or brushes 29 being so distributed that the electric current through the plates 26 will be continuous until the movement of the bed 7 will have carried these plates 26 past the ends of the conducting-bars 28, the said plates 26 being of such small cross-sectional area that sufficient resistance will be offered the passage of the electric current therethrough as to induce in the magnetic particles of the iron brought in contact therewith sufficient magnetism to cause these magnetic particles to attach themselves to and hold on until these soft-iron plates 26 in the movement of the bed 7 will have passed the end of the conducting-bars 28, when the electric circuit through each plate will be broken as it passes the end of said bars 28 and the plate become demagnetized, the further movement of the bed 7 causing these particles to be carried over the roller 4, when they will fall in the pan 30 or some receptacle therefor. A revolving brush, 31, which extends the entire width of the plates 26, will remove any particles which may adhere to the plates.

The manner of operating is as follows: The bed 7 having been caused to travel in the direction indicated by the arrows, by throwing in gear the pulley 8 and water having been turned on at the faucet 11, a stream will be caused to flow over the upper surface of the bed by the inclination thereof, the velocity of which may be regulated by the elevating-screws 22, the water escaping over the lower end of the bed. The ore which has been pulverized is thrown on the feeder 24, from whence it will be distributed over the bed and on the upper surface thereof, subjected to the action of the flowing water. The particles of iron which are the heavier, being separated from the gangue and sinking to the bottom of the depressions 13 of the bed and in the quiet water therein, will be brought in contact with the iron plates 26, and in consequence of the electric current passing through the said plates in the manner described these iron particles will become magnetized, attaching themselves to and holding onto the iron plates until, by the movement of the bed, they will have passed the ends of the conducting-rods 28, when the current of electricity through the plates 26 will be broken and the particles of iron adhering thereto will be demagnetized and drop therefrom to the bed, the continued movement of which will carry them over the roller 4, when by gravity they will fall in a vessel provided therefor, the brush 31 serving to remove any particles of iron from the plates which may not have fallen therefrom, the gangue from which the iron has been separated being carried by the flowing water over the lower end of the bed and permitted to escape.

Having described my invention and manner of operating, what I claim, and desire to secure by United States Letters Patent, is—

1. In a device for collecting metallic ore, the combination of a moving endless bed provided with the metallic plates 26, means for causing an electric current to pass through the said plates, and means for causing a stream of water to flow over the said bed, for the purpose set forth.

2. In a device for collecting metallic ores, the combination of an endless bed, 7, provided with the raised sides 17, rollers 12, for supporting said bed, intermediate rollers, 14, provided with the flanges 16 thereon, in which move the raised sides 17 of the bed, and whereby an undulating movement is imparted thereto, means for causing a stream of water to flow over the said bed, and means for imparting movement to the said bed, for the purpose set forth.

3. In a device for collecting metallic ores, the combination of an endless bed, 7, provided with the metallic plates 26, means for causing an electric current to pass through the said plates, consisting of the rods 28, connected, respectively, to the negative and positive poles of a dynamo or galvanic battery, the swinging arms 29, suspended from the said rods and placed in the path of the said plates 26, whereby the electric current will be caused to pass therethrough, the said arms and rods being placed over the upper surface of the said bed 7, whereby, when the bed leaves this upper surface, the current of electricity through the plates 26 will be broken, means for causing a stream of water to flow over the said bed, and means for imparting movement to the said bed, for the purpose set forth.

In testimony whereof I affix my signature in presence of two witnesses.

HENRY H. EAMES.

Witnesses:
WM. L. BAILIE,
JNO. T. MADDOX.